United States Patent [19]

Warmka

[11] 4,059,775
[45] Nov. 22, 1977

[54] LINEAR MOTOR

[75] Inventor: Gary Paul Warmka, Bloomington, Minn.

[73] Assignee: Control Data Corporation, Minneapolis, Minn.

[21] Appl. No.: 743,890

[22] Filed: Nov. 22, 1976

[51] Int. Cl.² .......................................... H02K 33/00
[52] U.S. Cl. ...................................... 310/12; 310/36
[58] Field of Search ...................... 310/14, 36, 17, 38, 310/39, 12

[56] References Cited
U.S. PATENT DOCUMENTS

| | | | |
|---|---|---|---|
| 3,135,880 | 6/1964 | Olson et al. | 310/14 |
| 3,424,578 | 1/1969 | Strnat et al. | 75/213 |
| 3,459,976 | 8/1969 | Nyman | 310/36 |
| 3,813,566 | 5/1974 | Edwards et al. | 310/36 |
| 3,924,146 | 12/1975 | George | 310/36 |

Primary Examiner—Donovan F. Duggan
Attorney, Agent, or Firm—Edward L. Schwarz

[57] ABSTRACT

A linear motor having a permanent magnet armature whose interaction with the field provided internally by a closed flux path field core having a winding on one leg, provides the driving force.

4 Claims, 1 Drawing Figure

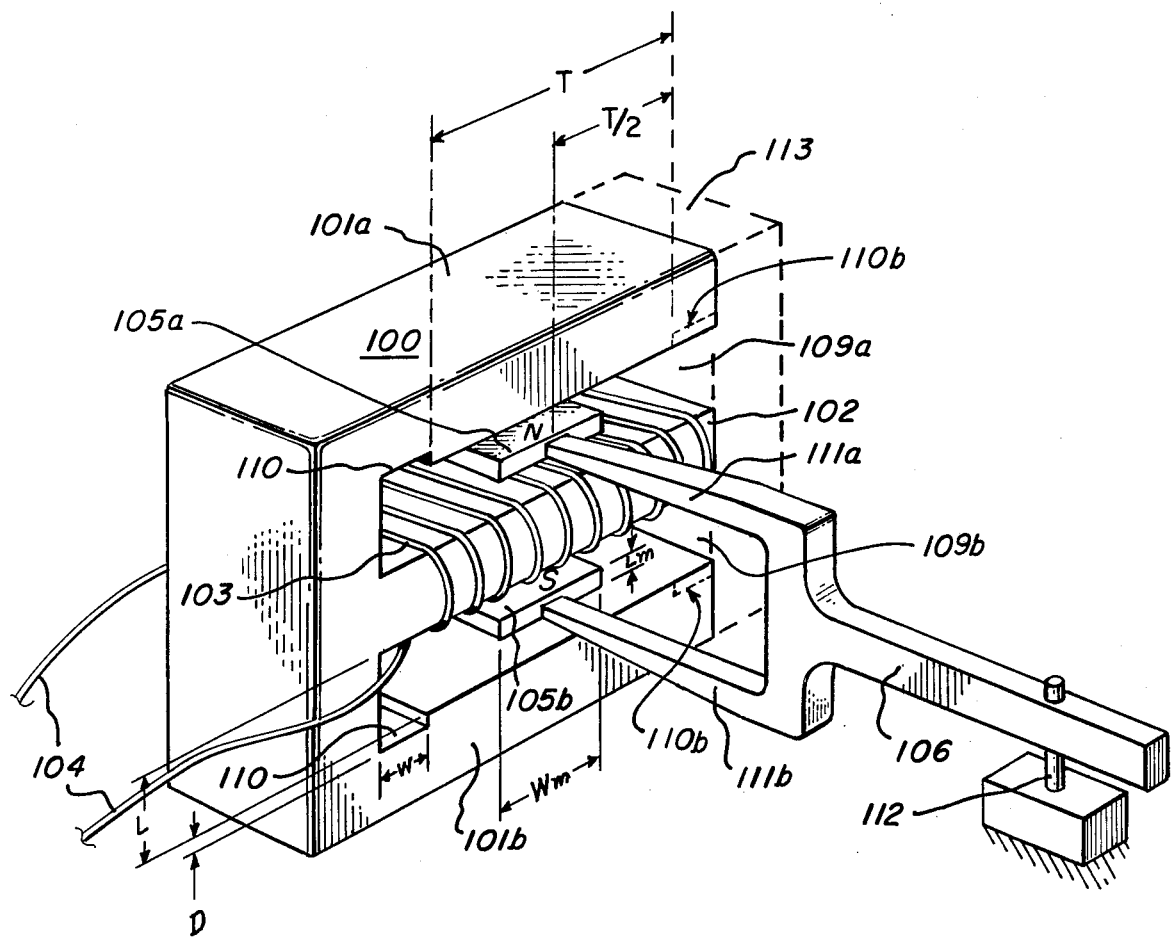

LINEAR MOTOR

BACKGROUND OF THE INVENTION

The field of the invention includes the various types of linear motors and so-called solenoids which provide straight line or circular motion are for a variety of applications, such as head positioning in disc memory drives, and pen positioning in plotters.

The closest prior art known is disclosed by U.S. Pat. No. 3,135,880 (Olson et al), which shows a device in FIG. 1 which is approximately the same as one-half of the device in this invention. As will be discussed infra, certain advantages are present in the approach in this invention.

BRIEF DESCRIPTION OF THE INVENTION

This linear motor employs an E shaped ferromagnetic field core comprising two exterior legs and one center leg extending approximately parallel, coplanar, and adjacent each other so as to define a slot on each side of the center leg. Additional iron or other core material integral with the three legs forms a flux path between the legs adjacent at least one end of the center leg. A current-carrying winding is wound around the center leg. A pair of permanent magnets, each of whose lengths, i.e., north and south pole face spacing, is less than the spacing between the winding and the exterior legs are supported in these slots so as to permit translation of the magnets along the slot between the winding the the leg outside it and to maintain the same magnet pole of each magnet adjacent the winding and the other pole of each adjacent one of the unwound field core legs. The path for the winding-generated magnetic flux may be completely closed, or may be broken by a flux gap at one or more locations, but preferably not in the legs themselves. The optimal clearance of the magnet in the slot depends on the lengths and strength of the magnets, in general being larger for greater length and strength. Passing a direct current through the winding creates a flux field which interacts with the permanent magnet flux fields to cause the magnets to be driven in one direction or the other, depending on current polarity, along the slots between the legs. While the magnets can be supported by a sliding carriage to be constrained within the slots, it is preferred that they be instead supported on a rotating arm whose pivot is at one side of the field core. As current passes through the winding the arm is rotated on its pivot. A connecting rod attached to the arm can provide straight line motion if desired. To prevent the magnets from being driven into the core material closing the ends of the slots, the nearest turn of the winding is spaced apart from this core material. The portions of the legs within this area of the slot neck down to produce a relatively wide slot at this area. The magnets are attracted by the relatively great amount of iron in the slot area adjacent the necked down portion and hence are impelled to stop in this position rather than be driven by current in the winding against the slot's ends.

The amount of force which the motor generates is very closely related to the total energy of the permanent magnet material. It is preferred that one of the so-called cobalt-rare earth ceramics be used for this purpose. These materials in particular, have a very high energy level (product of coercivity and flux density) and provide relatively large force from a relatively small amount of moving mass. At any rate, the magnet and the arm are the only moving parts, decreasing the moving mass in the device.

Accordingly, one object of this invention is to reduce the inherent inertia in linear motors.

A second object is to employ a fixed coil in an electromagnetic linear motor, simplifying application of power to the motor.

Still another object is to provide a linear motor of less weight and expense then previous designs.

BRIEF DESCRIPTION OF THE DRAWINGS

The FIGURE discloses a preferred embodiment of an electromagnetic linear motor having an E-shaped core serving as the flux path, with the winding on the middle leg.

DESCRIPTION OF THE PREFERRED EMBODIMENTS

In the FIGURE, core 100 is geneally E-shaped having two elongated inner slots 109a and 109b defined by center leg 102 and exterior legs 101a and 101b. Winding 103 is wound around leg 102. Magnets 105a and 105b comprise flat pieces of high magnetic energy material each of whose length (north to south pole face spacing shown as dimension $Lm$, for magnet 105b) is less than the spacing L between leg 102 and legs 101a and 101b respectively. Supporting arm 106 rotates on pivot 112 and carries auxiliary arms 111a and 111b, at whose free ends magnets 105a and 105b are attached respectively. This arrangement permits magnets 105a and 105b to translate back and forth parallel to the axes of legs 101a and 101b, and 102 substantially within slots 109a and 109b at all times. Magnets 105a and 105b are magnetized so that the direction of magnetization of each is through the magnet from the face adjacent winding 103 to the face adjacent leg 101a or 101b. As shown, the faces adjacent legs 101a and 101b are north poles, but of course they can as easily comprise the south poles, the change only causing opposite movement in response to a given current flow direction.

In operation, passing of direct current through winding 103 via leads 104 creates a flow of magnetic flux through core 100 in a direction dependent on the direction of current flow. Interaction between this flux and the flux produced by permanent magnets 105a and 105b produces force directed along the axis of leg 102. The force created is almost independent of the position of magnets 105a and 105b respective winding 103 as long as magnet 105 is between the ends of winding 103. The direction of this force is dependent on the direction of current flow through winding 103. Reversing current flow through winding 103 reverses the direction of force exerted on arm 106. A connecting rod, not shown, can be attached at any convenient place on arm 106 to provide straight line motion.

The sum of the clearances between either magnet 105a or 105b in its respective slot should in theory be equal to the length Lm of the magnet times the coercivity at maximum energy product divided by the flux density at maximum energy product, or $LmH/B$. For cobalt-rare earth ceramics B/H at maximum energy is approximately 1. For alnico, B/H at maximum energy is approximately 0.1, and for ordinary ferrites, B/H at maximum energy is approximately 0.25. Thus, clearances should be much less when using magnets made of the lower energy materials. The large clearances shown are to simplify understanding of the structure of this motor.

This design has been observed to have a significant dropoff of force near the closed ends of slots 109a and 109b due to flux leakage to the material closing the slots. Notches 110 are a preferred means for preventing this occurrence. Notches 110 widen slots 109a and 109b adjacent their closed ends, and keep the force relatively constant as long as magnets 105a and 105b are totally within the winding part of slots 109a and 109b. Additionally, the presence of properly shaped notches 110 provide a magnetic braking force if momentum of magnets 105a and 105b and the system driven by them drives the magnets into stops at the end of slots 109a and 109b. Notches 110 must be shaped so that as magnets 105a and 105b approach the ends of slots 109a and 109b, they will be moving away from the minimum reluctance or maximum flux path. The natural attractive force of magnets 105a and 105b to the material comprising core 100 produces a force decelerating magnets 105a and 105b once they enter the notched areas of slots 109a and 109b. It should be kept in mind that the dimensions of notches 110 are not to scale because of the extra width of slot 109 displayed in FIG. 1 to simplify understanding of the invention. The preferred width W of notches 110 also depends on the length of magnets 105a and 105b. The minimum value of W should be the length Lm of the magnet in the corresponding slot, and the maximum should be the magnet's width, $Wm$, parallel to the axis of leg 102. The depth of a notch 110 should be at least 50% of the total clearance of the faces of a magnet 105a or 105b, from legs 102, 101a, and 101b, but not so deep as to cause saturation of cores 100 adjacent notches 110.

The openings at the far ends of slots 109a and 109b are optional. Element 113 can bridge the open ends of the slots and may or may not be a magnetic conductor. If element 113 is present as a magnetic conductor the cross sectional area of leg 102 still must be sufficient to conduct all the flux of magnets 105a and 105b without saturating, and notches 110b with the same dimensions as notches 110 may be added to legs 101a and 101b. If the length of stroke (T-$Wm$) of magnets 105a and 105b in slots 109a and 109b is less than the width of the magnets, $Wm$, then element 113 as a magnetic conductor can be used to reduce the cross sectional area of legs 101a, 101b and 102 in proportion to the amount of magnetic flux that does not pass beyond the midpoint of the travel T. This is possible because the flux will split and travel both ways thru leg 102 depending on what is the path of least reluctance for the flux.

The use of two magnets 105a and 105b produces important advantages over a single magnet structure, such as shown in the Olson et al. patent. The magnets are offset in slots 109a and 109b to make room for winding 103. Thus, there is a magnetic attraction between magnets 105a and 105b to corresponding core legs 101a and 101b respectively. Use of two magnets produces forces which in large part cancel each other and hence drastically reduce stresses on bearing 112. The two rectangular magnets are cheaper to manufacture and magnetize than the toroidal magnet of FIGS. 5 and 6 in Olson et al. While not quite as efficient in the use of the flux produced by winding 103, the two magnet design does use two sides of the winding and most of its flux while allowing use of the pivoting arm magnet support shown.

Having thus described the invention, what is claimed is:

1. A linear motor comprising
   a. an E-shaped field core of ferromagnetic material having a first leg and second and third legs on opposite sides of, substantially parallel to, and spaced apart from the first leg, at least one leg containing a notch adjacent the closed end of the space between adjacent legs;
   b. a winding wound on the first leg and forming between itself and the second and third legs first and second slots respectively;
   c. first and second substantially rectangular magnets having north and south pole faces opposite faced and spaced apart less than the width of each slot; and
   d. rotating arm means for supporting the first and second magnets in the first and second slots respectively, with similar pole faces adjacent the winding, for allowing translation of the magnets along the legs while maintaining the pole faces in substantially the same position during translation of the magnets.

2. The apparatus of claim 1, wherein the length of each notch along the axis of the leg is at least equal to the distance between the pole faces of the magnet located in that slot, divided by the B/H ratio of the magnet, and less than the width of the magnet as measured in its direction of translation.

3. The apparatus of claim 2, wherein the depth of each notch is at least equal to 50% of the total clearance of the magnet located in the slot involved.

4. The apparatus of claim 1, wherein the second and third legs each contain a notch.

* * * * *